United States Patent Office 3,674,376
Patented July 4, 1972

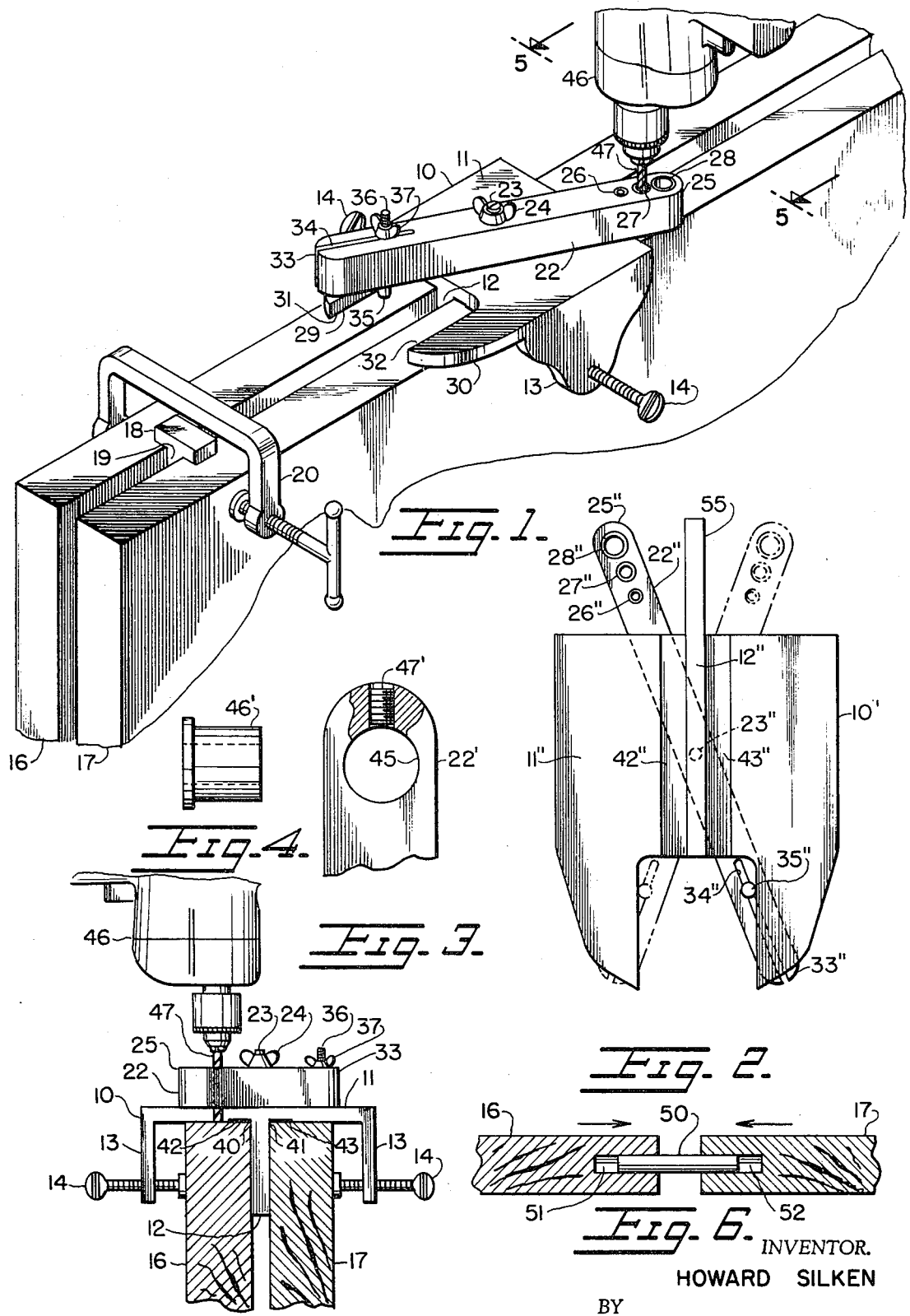

3,674,376
DOWELING JIG
Howard Silken, % Home and Industry Tool Distributors Inc., 2867 Long Beach Road, Oceanside, N.Y. 11572
Filed Feb. 18, 1971, Ser. No. 116,563
Int. Cl. B23b 47/28
U.S. Cl. 408—115
9 Claims

ABSTRACT OF THE DISCLOSURE

A doweling jig body clamps over the edges of two boards to be doweled together, the doweling jig body having a central positioning member extending downward between the boards and an arm pivotally mounted above it, the arm having at least one drill bushing in its front end and a longitudinally movable stop fixed in its back end, the stop extending downward to engage two inward facing surfaces of the jig body so that the stop allows the arm to pivot the same distance right and left to position at least one drill bushing over each board to drill a dowel receiving hole.

BACKGROUND OF THE INVENTION

Field of the invention

This invention provides a doweling jig to enable two boards to be accurately drilled to be doweled together in an edge to edge position.

SUMMARY OF THE INVENTION

A doweling jig has a flat body and a central positioning member extending downward therefrom, the flat body being designed to be disposed over the edges of two boards to be drilled to receive dowels to join the boards in an edge to edge relation. The central positioning member extends between the boards and the body may have downward extending sides containing inward turning clamp screws to clamp the boards against the central positioning member. An arm is pivotally mounted by its center on top of the jig body, the arm having a front end containing at least one drill bushing disposed beyond the end of the jig body. The jig body contains a cut away center portion under the other end of the arm, the cut away portion having two inward facing surfaces spaced equal distances outward from the central positioning member. The arm contains a longitudinal slot within which there is disposed a stop member which extends between the inward facing surfaces of the jig body. The stop, according to its placement along the slot in the arm, allows the arm to be pivoted the same distance right and left to position the drill bushing equal distances from the adjacent corners of the edges of the boards to accurately drill doweling holes.

The doweling jig of my invention is more easily and rapidly adjusted to accommodate boards of different thicknesses. It is rugged in construction, easy to use, and ensures the proper alignment of the doweling holes.

BRIEF DESCRIPTION OF THE DRAWING

FIG. 1 is a perspective view of fragments of two boards being drilled for doweling with the doweling jig of my invention;

FIG. 2 is a bottom view of a slightly modified doweling jig with its arm shown in one position in solid lines and in the other position in phantom lines;

FIG. 3 is a top view of a modified fragment of the front end of an arm of a doweling jig;

FIG. 4 is a side view of a drill bushing which may be fixed in the arm of FIG. 3;

FIG. 5 is a transverse section taken on line 5—5 of FIG. 1 showing the doweling jig of my invention clamped over two boards with a fragment of an electric drill drilling a doweling hole therein; and FIG. 6 is a transverse section through two boards containing doweling holes being joined by a dowel according to this invention.

DESCRIPTION OF THE PREFERRED EMBODIMENTS

As shown in FIGS. 1 and 5, doweling jig 10 has a flat body 11 from which a central positioning member 12 extends downward. The flat body 11 may have downward extending sides 13 through which are turned the clamp screws 14.

If two boards 16 and 17 are to be doweled together edge to edge, as in building up a table top, the boards 16 and 17 are aligned with their edges upwards and finished faces inwards with the central positioning member 12 between them. The jig 10 is secured in place by tightening the clamp screws 14 to clamp the boards 16 and 17 against the member 12. A T-shaped member of wood forms a spacer 18 having a central portion 19 of the same width as member 12. Central portion 19 is placed between the boards 16 and 17 which are clamped about it by a conventional C clamp 20 or the like. When clamp 20 is fixed in place, jig 10 can be moved to drill additional sets of doweling holes without the relative positions of the boards 16 and 17 being altered.

An arm 22 is pivotally mounted at its center by a threaded stud 23 fixed in body 11. Stud 23 has a wing nut 24 turned downward about it which may be used to lock arm 22 in its drilling positions. The front end 25 of arm 22 extends beyond body 11 and has pressed or otherwise fixed therein the three drill bushings 26, 27 and 28. The largest bushing 28 is disposed to the front of arm 22 because larger dowel drills are usually used on thicker boards 16 and 17 and thus must be positioned a greater distance to each side when arm 22 is pivoted right and left. Smaller drill bushings 27 and 26 are placed further back along arm 22 closer to its pivotally mounted center portion.

The back end of body 11 has an extension 30 within which there is formed opening 29 having inward facing surfaces 31 and 32. The back end 33 of arm 22 contains a longitudinal slot 34 within which a stop 35 having a threaded shaft 36 is slidably positioned and locked in place by a wing nut 37. A portion (not shown) of shaft 36 may be squared to prevent it from turning in slot 34 when wing nut 37 is tightened. Stop 35 extends below arm 22 to engage the surfaces 31 and 32 so that arm 22 may be pivoted the exact same number of degrees in both directions when stop 35 is locked in a given position in slot 34.

As may be seen in FIG. 5, the corners 40 and 41 have portions 42 and 43 cut away to ensure that the boards 16 and 17 are positioned flush against both body 11 and central positioning member 12. Electric drill 46 and drill bit 47 are used to drill doweling holes through a bushing 26, 27 or 28.

As shown in FIGS. 3 and 4, an arm 22' contains a single large aperture 45 which may receive a hardened steel drill bushing 46' which is secured in place by a set screw 47' or the like. This construction allows the use of a drill bushing 46' to accommodate any drill bit 47.

FIG. 2 shows a drill jig 10" having all the elements described in connection with the jig 10 of FIG. 1 except the sides 13 and the clamp screws 14. Drill jig 10" would be used in the manner described except that a C clamp (not shown) would be used to clamp the boards 16 and 17 against the central positioning member 12".

FIG. 6 shows the boards 16 and 17 being doweled together by inserting a glue covered dowel 50 in the doweling holes 51 and 52 and forcing the boards together.

It is to be noted that whether the boards 16 and 17 are drilled in the centers of their edges or not, or whether they are of different thicknesses or only have one side finished, the sides facing the central positioning member 12 or 12" will be perfectly aligned relative to dowel holes 51 and 52 to form a smooth surface on doweling.

As may be further seen in FIG. 2, member 12 or 12" may have an extension 55 which projects beyond the drill bushings 26–28 or the single drill bushing 49. This allows the short ends of mitered boards to be clamped to projection 55 with a C clamp for doweling.

While my invention has been shown and described in the best forms known to me, it will nevertheless be understood that these are purely exemplary and that modifications may be made without departing from the spirit of my invention.

What is claimed is:

1. A doweling jig comprising, in combination, a flat body, a central positioning member extending downward from said flat body, an arm centrally and pivotally mounted on said body, said arm having a front end extending beyond said body and containing at least one drill bushing, said arm having a rear end, a stop slidably mounted on the rear end of said arm, means locking said stop to said arm at a selected position, said body having two inward facing surfaces on each side of said stop engaged by said stop limiting the pivoting of said arm the same amount right and left, and means clamping boards on each side of said central positioning member to be drilled for doweling through said at least one drill bushing.

2. The combination according to claim 1 wherein said means clamping boards on each side of said central positioning member is a C clamp.

3. The combination according to claim 1 wherein said means clamping boards on each side of said central positioning member comprises downward extending sides of said jig body and clamp screws turned inward through said sides.

4. The combination according to claim 1 wherein said at least one drill bushing in the front end of said arm is a single drill bushing removably fixed in said arm.

5. The combination according to claim 1 wherein said at least one drill bushing is a number of drill bushings of different sizes, larger bushings being disposed closer to the front end of said arm.

6. The combination according to claim 1 wherein said central positioning member has an extension projecting forward beyond said at least one drill bushing in said arm.

7. The combination according to claim 1 wherein said jig body has a rear extension containing an opening having said inward facing surfaces on each side thereof, said stop extending downward from said arm into said opening.

8. The combination according to claim 7 wherein said arm contains a longitudinal slot in the rear end thereof, said means locking said stop to said arm comprising a threaded shaft extending upward from said stop through said slot, and a wing nut turned downward about said threaded shaft.

9. The combination according to claim 8 with the addition of a threaded stud extending upward from said body through the center of said arm pivotally securing said arm to said body, and a second wing nut turned downward about said stud locking said arm in right and left hand drilling positions.

References Cited
UNITED STATES PATENTS

| | | | |
|---|---|---|---|
| 2,838,966 | 6/1958 | Campbell | 408—115 |
| 2,810,310 | 10/1957 | Saunders | 408—115 |

GIL WEIDENFELD, Primary Examiner

U.S. Cl. X.R.

33—189